(12) United States Patent
Garvey et al.

(10) Patent No.: US 6,286,764 B1
(45) Date of Patent: Sep. 11, 2001

(54) FLUID AND GAS SUPPLY SYSTEM

(76) Inventors: Edward C. Garvey, 1042 SE. 163$^{rd}$, Bellevue, WA (US) 98008; Donald D. Onorati, 38524 Athy Ct., Fremont, CA (US) 94536

( * ) Notice: Subject to any disclaimer, the term of this patent is extended or adjusted under 35 U.S.C. 154(b) by 0 days.

(21) Appl. No.: 09/353,255

(22) Filed: Jul. 14, 1999

(51) Int. Cl.$^7$ .................................................. G05D 23/13
(52) U.S. Cl. .............................. 236/12.12; 236/51; 4/676
(58) Field of Search .......................... 236/12.12, 51; 4/676, 677

(56) References Cited

U.S. PATENT DOCUMENTS

| | | | |
|---|---|---|---|
| 4,359,186 | 11/1982 | Kiendel | 137/88 |
| 4,420,811 | 12/1983 | Tarnay et al. | 364/510 |
| 4,682,728 | 7/1987 | Oudenhoven et al. | 236/12.12 |
| 4,696,428 | 9/1987 | Shakalis | 236/12.12 |
| 4,909,435 | * 3/1990 | Kidouchi et al. | 4/676 |
| 4,941,608 | * 7/1990 | Shimizu et al. | 236/12.12 |
| 4,945,943 | 8/1990 | Cogger | 137/360 |
| 5,033,671 | * 7/1991 | Shiba et al. | 236/12.12 |
| 5,050,062 | 9/1991 | Hass | 364/152 |
| 5,170,361 | 12/1992 | Reed et al. | 364/510 |
| 5,174,495 | 12/1992 | Eichholz et al. | 236/12.12 |
| 5,294,045 | 3/1994 | Harris | 236/12.12 |
| 5,590,831 | * 1/1997 | Manson et al. | 236/51 |
| 5,595,342 | * 1/1997 | McNair et al. | 236/51 |
| 5,845,844 | * 12/1998 | Zosimodis | 236/51 |

FOREIGN PATENT DOCUMENTS 2595108  3/1986 (FR) .
89/09956 10/1989 (WO) .

* cited by examiner

*Primary Examiner*—William E. Tapolcai
(74) *Attorney, Agent, or Firm*—Townsend and Townsend and Crew LLP

(57) ABSTRACT

A fluid or gas delivery system is provided for controlling fluid or gas temperature, flow rate and volume at a system outlet. The system comprises single or double control valves for regulating flow of a first fluid or gas and a second fluid or gas from corresponding first and second fluid or gas sources into a mixing port, wherein the first fluid or gas has a different temperature from the second fluid or gas. A fluid or gas supply control valve actuator operatively connected to the first and second fluid or gas supply valves actuate opening and closure operations of the valves. A thermosensor thermally coupled with the mixing port senses an estimated present temperature of a mixed fluid or gas within the mixing port. A flow control valve regulates flow of a mixed fluid or gas at the system outlet. A flow control valve actuator operatively connected to the flow control valve actuates opening and closure thereof. A user interface including user input means for selecting a set temperature, flow rate and volume of fluid or gas at the system outlet is provided along with a user display for displaying one or more system functions or parameters. Control means are provided for receiving signals from the thermosensor and user interface and for processing the signals to generate appropriate control signals to control the fluid or gas supply control valve actuator and flow control valve actuator means to achieve programmed or user-selected set temperature, flow rate and volume at the system outlet.

31 Claims, 7 Drawing Sheets

FLUID AND GAS SUPPLY SYSTEM

TECHNICAL FIELD

The present invention relates to methods and devices for automatically monitoring and adjusting flow rates, volumes and temperatures of fluids and gases within plumbing and other supply systems, particularly within residential and commercial supply systems.

BACKGROUND OF THE INVENTION

A desired feature for fluid and gas supply systems is to provide fluid and/or gas flows within the system, particularly at system outlets, that can be maintained at pre-determined temperatures, flow rates and/or total volumes. For example, in residential plumbing systems, it is desirable to deliver fluid at system outlets, for example at a shower head, sink outlet, or appliance intake, at a stable, user-defined temperature, flow rate, and/or volume. Similarly, in commercial plumbing systems, such as those found in laboratories, medical facilities, aquacultural facilities, nurseries, manufacturing facilities, restaurants, hotels, and the like, it is desirable to provide fluid flows within the plumbing system and/or at system outlets that are maintained at a pre-selected temperature, flow rate, and/or volume.

Conventional supply systems that rely on manual valve mechanisms to adjust fluid flow rates and temperatures generally suffer undesirable fluctuations in temperature and flow values due to changes in demand/supply within the system. Initial fluctuations are attributable in large part to inadequate control devices, for example input and valve regulatory mechanisms. In this context, standard residential plumbing systems generally exhibit initial fluctuations of temperature and flow at system outlets due to insensitivity and/or overadjustment of user operated valves (eg., outlet controls for hot and cold water delivery). Moreover, even after desired temperature and flow values have been initially set by the user, swings in temperature and flow may continue to arise during use as a function of supply changes (eg., depletion of hot water) and remote demands (eg., initiation or cessation of demand by a second user) within the water system are a familiar occurrence. Thus, in the past it has been necessary to frequently manipulate system input controls and to tolerate reflexive changes and attendant delays for system equilibration in order to set and maintain desired temperature and flow values.

Despite the long persistence of these problems, current input and mixing systems for controlling fluid and gas temperature and flow rates fail to provide a full range of adequate solutions. For example, in most residential and commercial plumbing systems, devices and methods for controlling fluid temperature and flow at outlets still involve conventional hot and cold water valves. These are manually adjusted to independently regulate flow from the hot and cold water lines through the output. However, the tasks of manually initiating two valves or, optionally, a single valve with two inputs and one output, to select a desired flow rate and temperature, manually testing initial flow and temperature, and fine-tuning the valves to maintain desired flow and temperature, is time consuming and can expose the user to extreme, even dangerous, temperatures and flows. These problems are particularly notable in fluid supply systems having more than one outlet, such as in residential supply systems, were remote fluid demands by appliances or other users contribute to the frequency and range of temperature and flow fluctuations.

More advanced input and mixing devices for fluid and gas supply systems incorporate electronic input and control mechanisms to regulate fluid or gas temperature and flow. In this context, a variety of designs have been proposed for electronic-controlled mixing of hot and cold fluids to produce a mixed fluid having a preselected temperature. Many of those proposed systems utilize analog circuitry to provide a feedback control algorithm. For example, U.S. Pat. No. 4,359,186 issued to Kiendel discloses a mixing valve arrangement employing motor driven valves to supply hot and cold water to a mixing chamber. Temperature of the water in the mixing chamber is measured and is used, along with the flow rate of fluid moving through the mixing chamber, in an analog control circuit that provides signals to control the valve motors in response to temperature variations. However, this type of temperature control system is relatively inflexible, and, in order to adjust control constants or change the control algorithm, circuit components must be physically replaced or adjusted.

Other proposed fluid and gas control systems incorporate a digital processor, such as a microcomputer, for implementing a control algorithm. For example, U.S. Pat. No. 4,420,811 issued to Tarnay et al. discloses a water temperature control system in which a feedback control algorithm is implemented by a microcomputer. However, the valve arrangement, configuration of the water discharge channel, and the temperature sensor device of this system are not specifically directed to achieving rapid and accurate temperature and flow responses.

A more advanced fluid temperature control system is disclosed in U.S. Pat. No. 5,050,062 issued to Hass. This system uses a microcomputer coupled with a temperature sensor to provide automatic control of hot and cold supply valves, whereby a fluid mixture discharged from the system can be maintained at a preselected temperature within predetermined limits. The fluid temperature control system actively mixes hot and cold fluids using together before measuring the temperature of the fluid mixture. Mixing of the fluids takes place in a special mixing chamber and is controlled for each of the hot and cold valves by a separate stepper motor connected therewith. The stepper motors move the respective valve members to regulate hot and cold fluid flow into the mixing chamber.

To control fluid mixing within this system, a temperature sensor is connected to the system outlet connection and is adapted to generates an analog signal corresponding to an actual temperature of the mixed fluid in the outlet connection. The analog temperature signal is amplified and conditioned, and thereafter converted into a digital temperature signal corresponding to the actual temperature of the mixed fluid. The digitized signal from the converter is sent to the microprocessor which is programmed to use the digitized temperature signal within a feedback control algorithm to generate control signals for the stepper motors to regulate the hot and cold supply valves to cause the actual temperature of the mixed fluid to approach the preselected temperature. In more detailed embodiments, the system allows for entry of a selected set point temperature by a user inputting the selection into a programmable microprocessor, for example by means of a keypad or remote computer connected to the processor. Also provided is a display for indicating system parameters, including the set point and actual temperatures of mixed fluid, and a selected flow rate.

Other proposed fluid control systems also incorporate a microcomputer for automatically adjusting fluid system parameters. In this regard, U.S. Pat. No. 5,170,361 issued to Reed et al. discloses a similar control system to that set forth in the Haas patent, supra. However, system parameters which are monitored and maintained to closely approximate user selections via the microprocessor include temperature, flow rate, and volume. This system also features first and second valves to regulate fluid flow from two supplies (eg., hot and cold), along with sensing means to sense open or closed positions for each valve. Also provided are means for activating the first and second valves to regulate their discharge into a dispensing pipe. Other sensors include mixed flow and temperature sensors.

The system of Reed also features a user input that provides for termination of hot and/or cold fluid flow, and for selection of mixed fluid flow rate and temperature. A processor receives data from the sensors (valve, temperature, and flow) and provides a signal to control the valve activating means, to adjust the mixed fluid flow rate and temperature. Also provided is a user display that shows system status information, and a remote control capability including a portable control unit or personal computer linked to the control panel.

Another electronically controlled fluid delivery system is described in U.S. Pat. No. 4,682,728 issued to Oudenhoven et al. This system uses a multi-port valve and stepper motor to control the volume ratio of two fluids, eg., hot and cold water. Mixed water passes through a flow rate control valve disposed near the outlet port controlled by a separate stepper motor. To maintain a selected temperature and flow rate, the user may input selections, eg., via a keypad, into the control unit, which selections may subsequently be recalled by the user from the control unit's memory. The control unit also receives input signals from a temperature sensor, compares the sensed temperature to the user-selected temperature stored in the control unit, and signals the stepper motors for the temperature and flow control valves to regulate system parameters. Also provided is a display unit that signals when the desired temperature has been reached.

Additional features include a maximum temperature shut off safety, and an auxiliary power source to maintain system operability during power outage.

Yet another electronically controlled fluid delivery system is described in U.S. Pat. No. 4,696,428 issued to Shakalis. This system features a dual temperature mixing valve controlled by a mixing valve actuator. Mixed fluid flows through a volume control valve and is sampled by a temperature sensor and flow sensor prior to exiting the outlet. The sensors signal a controller unit which interprets the signals and outputs corrective signals to the mixing valve actuator and volume control valve to adjust temperature and flow rate to approximate user-selected values. A user interface allows user selection of system parameters, eg., to allow selection of a constant temperature via a keyboard operably connected to the controller, and also displays system parameters (eg., temperature and flow rate).

While the foregoing, electronic fluid control systems overcome many of the problems that attend conventional plumbing and manufacturing systems, these systems nonetheless suffer a variety of drawbacks in terms of cost, complexity of installation and operation, range and flexibility of functions, and other attributes. Each of the systems outlined above suffer to some degree from these common shortcomings. Moreover, among the electronic fluid and gas supply systems heretofore proposed, a variety of desirable features that would add yet additional desired functions and uses have not been developed.

Therefore, it is an object of the present invention to provide a fluid and gas control system which is easily operated and which provides for user selection, memory storage and recall, and accurate system maintenance, of a broad range of supply parameters including pre-determined temperatures, flow rates, periods of flow, and volumes.

It is a further object of the invention to achieve the foregoing objects in a fluid and gas control system which can be incorporated within both residential and commercial supply systems, the latter including medical facilities, scientific and photographic laboratories, aquacultural facilities, nurseries, manufacturing plants, chemical plants, restaurants, hotels and the like.

SUMMARY OF THE INVENTION

The invention achieves these objects and satisfies other objects and advantages by providing a fluid or gas delivery system for controlling fluid or gas temperature, flow rate and volume at a system outlet. The system includes one or more fluid or gas supply control valve(s) for regulating flow of a first fluid or gas and a second fluid or gas from corresponding first and second fluid or gas sources into a mixing port. The first fluid or gas has a different temperature from said second fluid or gas. A fluid or gas supply control valve actuator is operatively connected to the fluid or gas supply valve for actuating opening and closure operations thereof. A thermosensor is thermally coupled with the mixing port to sense an estimated present temperature of a mixed fluid or gas within the mixing port. A fluid or gas control valve is also provided for regulating flow of mixed fluid or gas flow at the system outlet. In addition, a flow control valve actuator is operatively connected to the flow control valve to actuating opening and closure operations thereof.

The system of the invention also features a user interface including a user input for selecting a set temperature, flow rate and volume of fluid or gas at the system outlet. The interface also incorporates a user display for displaying one or more system functions or parameters.

A system control device is provided which receives signals from the thermosensor and user interface and processes the signals to generate appropriate control signals to control said fluid supply control valve actuator(s) and said flow control valve actuator means to achieve programmed or user-selected set temperature, flow rate and volume at the system outlet.

Alternate embodiments of the invention are directed to a domestic water supply system and a central heating and cooling system.

The features and advantages of the system according to the present invention will become apparent from the following description thereof taken in conjunction with the drawings.

DESCRIPTION OF THE SPECIFIC EMBODIMENTS

The instant invention provides a fluid and gas supply system, and related methods for controlling fluid and gas supply, which employ electronic input and control means to accurately regulate system parameters and functions, for example fluid or gas temperature, flow, and volume, among other parameters and functions.

Figure 1:
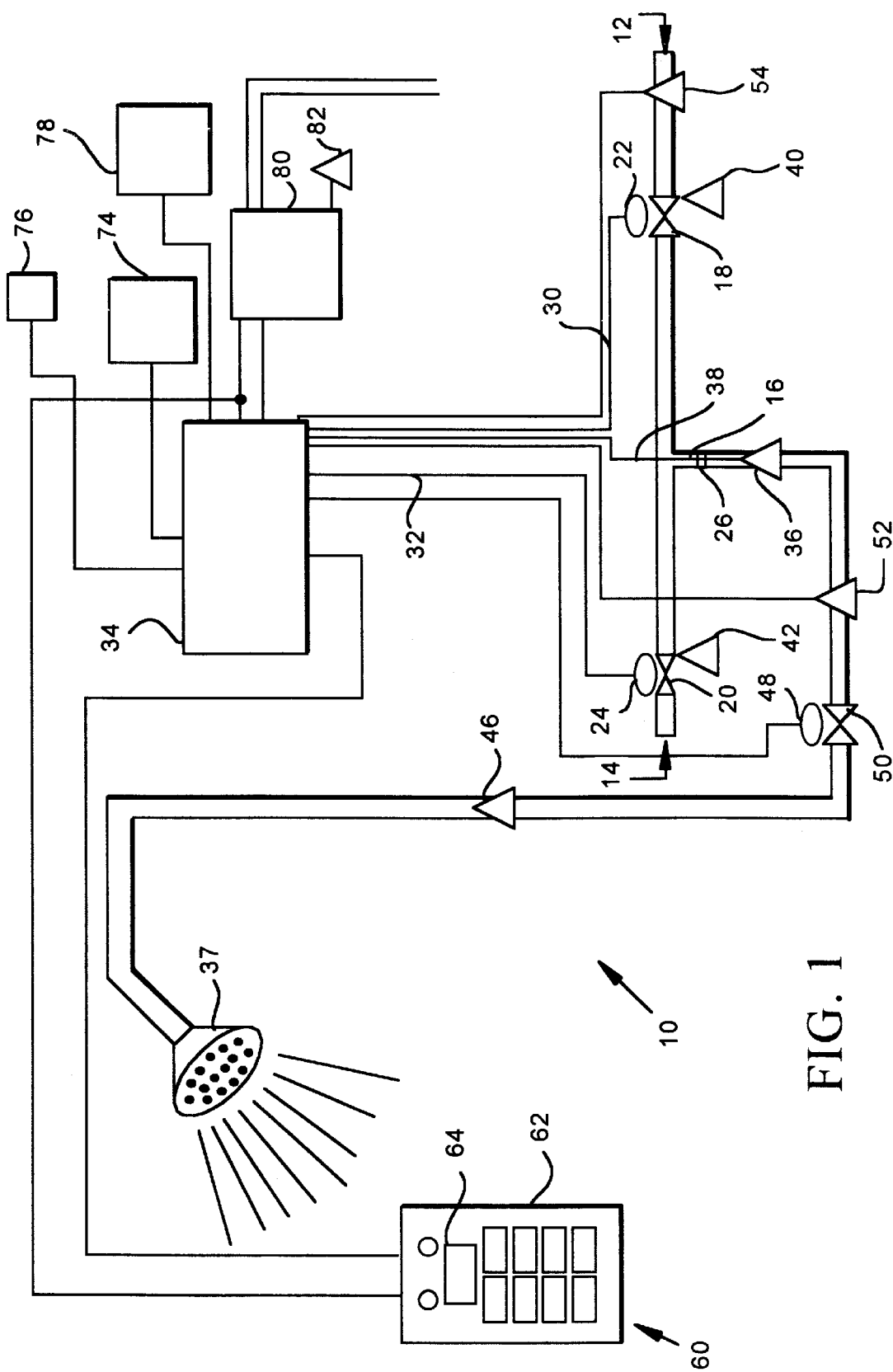
FIG. 1 provides a schematic illustration of a domestic fluid supply system employing the concepts of the invention.

In preferred aspects of the invention, a supply system is provided which electronically regulates temperature, flow and volume of a fluid or gas delivered from multiple sources (eg., hot and cold water sources, multiple solvent sources, combustible gas and air sources, etc.) In one example schematically depicted in FIG. 1, a flow system of the invention is incorporated within a domestic plumbing system. More specifically, FIG. 1 depicts a domestic shower supply system 10 which receives fluid from a first and second fluid source, eg., a hot water source (arrow 12), and a cold water source (arrow 14). The first and second fluid sources are fluidly connected to one or more mixture control (supply) valves that regulate flow of the first and second fluids into a fluid mixing port 16 which may be in the form of a specially adapted mixing chamber or simple fluid conduit.

In the embodiment of the invention illustrated in FIG. 1, the hot water source 12 and cold water source 14 are each regulated by a separate supply valve, a hot water supply valve 18, and cold water supply valve 20. Alternately, a single valve can control both hot and cold water flow into the fluid mixing port 16. Commensurate with broader aspects of the invention, these and other control valves can be selected from a variety of conventional, electronically-controlled valves useful for regulating (i.e., initiating, terminating and modulating) flow of gases and/or fluids. Thus, for example, the hot and cold water supply valve(s) may be motor-driven or actuated by proportional solenoid, pressure solenoid or other valve actuation means adapted for electronic valve control. The valves must be capable of opening and closing smoothly, rapidly, and with adequate precision to achieve fine control of hot and cold water supply. In this regard, the valve must be capable of being adjusted by very small increments to provide a sufficient degree of precision for user selection and adjustment of water temperature. Additionally, the valves must be adapted for rapid actuation but must not move too fast or too far upon actuation so as to result in an adjusted valve position that overshoots a target supply setting.

In the embodiment of the invention depicted in FIG. 1, the hot and cold water supply valves 18, 20 are actuated by a hot water control motor 22, e.g., a stepper motor, and a cold water control motor 24, respectively. These motors function similarly to actuate the hot and cold water supply valves, eg. by moving a valve member in relationship to an associated valve seat to open or close the valve, thereby increasing or decreasing hot or cold water flow into the fluid mixing port 16. In this regard, the design and construction of control motors, e.g., stepper motors, are well known in the art, and a variety of such motors are commercially available for use within the invention. Although electric driven motors are preferred for most embodiments of the invention, other types of motors, including pneumatic, hydraulic, and magnetic driven motors may be used. While electric driven motors are preferred for most embodiments of the invention, pneumatic and hydraulic motors may be selected in situations where the valves actuated by the motors are large (eg., in large commercial supply systems), or when electric drive motors are otherwise undesirable.

In preferred aspects of the invention, a mixing device 26 is provided to facilitate mixing of gases or fluids together 10 after the gases or fluids are combined from their respective supply sources, eg. within the fluid mixing port 16. As exemplified in FIG. 1, the mixing device is preferably disposed within the fluid mixing port or otherwise fluidly connected to the hot and cold water supply sources 12, 14. The fluid mixing device operates to facilitate mixture of the hot and cold water after these fluids exit the hot and cold water supply valves 18, 20, to ensure that a substantially uniform temperature is achieved within the mixed fluid to facilitate accurate sensing of mixed fluid parameters, as discussed below. Thus, the mixing device may be in the form of an active mixing device such as a motor-driven blade or spindle disposed within the mixing port operable to blend the hot and cold water (or other fluids, or gases) into a homogeneous mixture. Alternatively, the mixing device may be a passive mixing mechanism, for example a series of transverse baffles or surface protrusions within the mixing port 16 that creates turbulence and/or directs opposing flows together to effect mixing.

To actuate the hot and cold water supply valves 18, 20, the control motors 22, 24 receive one or more control signals via respective control connections 30, 32. These connections may be electrical control connections, e.g., conventional wire connections, or remote connections incorporating, e.g., conventional infrared (IR), radio frequency (RF), internet, intranet, direct connect remote access, satellite, or laser devices for signal transmission, reception and integrated control. To generate and coordinate signals to the supply valves, the invention employs a control unit 34 which may be in the form of a stand alone controller, a single task control logic unit, or a microprocessor. The system shown in FIG. 1 incorporates a microprocessor control unit coupled with an array of system parameter and system function sensors, as described below, which provide input signals to the processor, which in turn processes the input signals based on feedback algorithms to generate control signals that regulate a variety of system operations, including opening and closing operations of the supply valves.

Thus, in one aspect of the invention, a mixed fluid temperature sensor 36 is coupled and positioned for thermosensory communication with mixed fluid within the mixing port 16, or at another position distal (i.e., closer to a system outlet, such as a shower head 37) from the hot and cold water supply valves 18, 20. The temperature sensor includes thermosensory means (eg., a thermocouple, resistance temperature device, or thermistor) and signal generating means to sense a present temperature of the mixed fluid and transmit a signal corresponding to the present temperature value (eg., a digital or analog signal proportional to the actual present temperature value) to the control unit 34.

A variety of temperature sensors 36 and sensor installment configurations (eg., in-flow, or externally connected) are known in the art and are readily available for use within the invention. If the selected sensor transmits an analog signal to a digital processor control unit 34, it is first amplified and conditioned and thereafter converted into a digital temperature signal corresponding to the actual present temperature of the mixed fluid. The digitized signal from the converter is then sent to the microprocessor, which is programmed to use the digitized temperature signal within a conventional feedback control algorithm to generate control signals for the control motors 22, 24 to regulate the hot and cold water supply valves 18, 20.

Although analog signal-generating sensors are useful within the invention, it is preferable to use digital sensors. These sensors provide a digital reading of desired system parameters and functions, eg., temperature, directly, thereby eliminating the need for analog-to-digital converters. Preferred temperature sensors in this context have a broad temperature measurement range, eg., between −55° C. and +125° C., and are highly sensitive (eg., they are capable of sensing and signaling temperature changes in increments of 1.0° C. or less). In addition, preferred sensors may generate secondary signals, independent from the control unit, for example high temperature or low temperature alarm signals to indicate that the temperature of the mixed fluid has risen above, or fallen below, a user-defined high or low temperature threshold. Digital sensors can thus be incorporated within the invention to function on a stand alone basis (i.e., without requiring communication with a central processor), eg., by providing for entry and storage of user-defined temperature settings in a nonvolatile memory. Exemplary analog temperature sensors for use within the invention can be obtained from a variety of well known U.S. manufacturers, including National Semiconductor, Inc., Analog Devices, Inc., and TCI Corp. Exemplary digital temperature sensors can also be obtained from a variety of well known U.S. manufacturers, including National Semiconductor, Inc., Dallas Semiconductor, Inc., and Quantem Corp. In this context, preferred digital temperature sensors for use within the invention include the DS1620 and DS1621 digital thermosensors manufactured by Dallas Semiconductor (Dallas Tex.).

Again referring to the embodiment shown in FIG. 1, the temperature sensor 36 transmits the signal representing the present actual mixed fluid temperature to the central processing unit 34, eg., via a thermosensor connection, e.g., an electrical connection wire 38 or other connection means. The control unit 34 processes the temperature sensor input signal based on a conventional feedback algorithm to generate control signals which are then transmitted to the control motors 22, 24 to regulate opening and closing operations of the hot and cold water supply valves 18, 20 to achieve a mixed fluid temperature set point (eg., a pre-programmed or user-selected temperature set point).

In more detailed embodiments of the invention, the control unit 34 processes input signals from a variety of additional sensors that detect other system parameters and functions to provide for their regulation by the control unit. As shown in FIG. 1, these additional sensors can include hot and cold water supply valve sensors 40, 42, which sense (eg., mechanically or optically) the open or closed status and/or degree of closure of the respective supply valves 18, 20 (eg., by providing a signal corresponding to an angular position of the valve member). The signals generated by these sensors are transmitted and processed in a manner similar to that described above for the mixed fluid temperature signal to control stepper motor 22, 24 operation and thereby regulate mixed fluid temperature. This processing may be in conjunction with processing of the mixed fluid temperature signal to coordinately generate control signals for regulating the mixed fluid temperature. Alternatively, signals from the valve status sensors may be processed separately from other sensor signals, for example to provide a warning to the user that hot water supply is at a maximum (corresponding to a fully open signal from the hot water valve status sensor 40).

Additional sensors that are useful within the invention include flow sensors 46 which may be placed at various sites within a fluid or gas supply system to provide control signals for regulating important system flow parameters and functions. In the embodiment of FIG. 1, the flow sensor is located distal to the fluid mixing port and is otherwise designed and positioned to read total combined hot and cold water flow available for delivery to the system outlet 37. A variety of conventional flow sensor devices may be used. These will typically incorporate mechanical, in-flow sensor means.

The signal provided by the flow sensor 46 is transmitted to the control unit 34 and may be processed to provide a variety of user-informative and/or control signals. For example, the flow sensor signal may be processed by the control unit to provide information to the user designating a present flow rate. Alternatively or additionally, the control unit may process the signal in conjunction with a user-selected flow rate, flow time, or total flow volume to yield a control signal, which is in turn transmitted by the control unit to a flow control valve stepper motor 48 to actuate a flow control valve 50 to deliver a user-selected flow rate, flow time or flow volume (in a manner analogous to that described above in the context of temperature regulation). Thus, the signal can be processed by the control unit to yield a shut-off command to the flow control valve stepper motor to fully close the flow control valve 50 when a user selected or pre-programmed shut-off time or volume has been detected during a use period (eg., to draw a pre-determined bath volume or encourage or enforce conservative water use). Yet another alternative processing pathway for this flow signal can involve computation of total flow volume or time per use period, which value may be displayed as an informational signal to the user or stored to memory and later displayed and/or further processed, eg., to track total volumes and times used in a particular period or by a particular user such as a hotel patron.

Other temperature sensors may also be provided within the invention, which will differ from the above described, mixed fluid temperature sensor 36 primarily in terms of position and purpose. For example, within a domestic water supply system, a hot water temperature sensor 54 may be located proximal to a primary hot water source (eg., water heater) to provide a maximum system temperature reading. The signal transmitted by this sensor to the controller 34 may be processed to provide a user informative-signal (eg., warning the user that the hot water temperature is excessive, or has started to decline), or may be processed to provide a control signal. For example, the hot water temperature sensor signal may be processed by the controller to provide a safety shut-off command to the flow control valve stepper motor, to terminate flow in the event that the hot water temperature exceeds a programmed maximum value (notably, a similar control signal can be generated by the controller processing an excessive temperature signal from the mixed fluid temperature sensor 36).

A variety of additional sensors are contemplated within the invention that will be apparent to the artisan based on the various system designs, functions and methods described herein. For example, a range of gas and fluid supply systems will incorporate fluid and gas composition sensors 52, which sensors are capable of measuring a wide range of important fluid composition parameters. Within domestic supply systems, exemplary compositional sensors are provided to measure system performance and health-related parameters, including gas or water particulate content, additives, volatile organics, water hardness, presence and/or concentrations of lead and other toxins, chlorine and/or fluoride content, bio-organics and microorganism content (eg., coliform bacteria levels), and like parameters. Commercial supply systems will be equipped with a similar range of composition sensors specifically adapted for the particular uses and requirements of the system.

In preferred embodiments of the invention, the control unit 34 digitally processes the signal from the system sensors to generate appropriate, user-informative and control signals to display or control system parameters and functions. For example, the control unit is specifically programmed to receive a signal from the temperature sensor and to compute therefrom an error value between the present mixed fluid temperature and a user-selected or pre-programmed target temperature for the mixed fluid. This and other digital processing functions within the invention are provided by a conventional microprocessor, preferably comprising a central processing unit (CPU) operably connected with an input/output (I/O) inter-face, random access memory (RAM), and read only memory (ROM) through a data bus. A variety of microprocessors with this basic design are known in the art and are readily adaptable for use within the invention.

Control of system parameters and functions within the invention may be provided entirely by the control unit 34 by original programming. Thus, a programmable digital processor may be used to digitally implement feedback control of a wide range of system parameters and functions. These parameters and functions, for example, target temperatures, flow rates, and desired volumes, can be pre-determined without a requirement for re-programming or specific user input. Alternatively, the feedback algorithm(s) can be changed, or control coefficients for a particular type of feedback system can be altered, by reprogramming the processor.

With regard to control modes, a variety of feedback algorithms may be selected to control system functions (eg., valve operation), for example proportional, proportional plus integral, proportional plus integral plus derivative, feed forward, or other suitable control algorithm types. For controlling fluid temperatures, digital implementation of a proportional plus integral algorithm provides a preferred control mode, by integrating current temperature error as well as historical error to compute adjustments of hot and cold water supply valves 20, 22, thereby minimizing underdamping and overdamping. Other adaptive algorithms are known in the art and can be readily implemented within the devices and methods of the invention to achieve stable, consistent fluid output parameters, despite fluctuating system conditions such as irregularities in hot and cold fluid demand or supply.

In preferred aspects of the invention, a user interface 60 is provided which includes a user input device 62, for example a keypad, and a user display 64. The user input device allows for user selection of pre-programmed system parameters and functions, and also allows for user programming of the control unit 34 to input new system parameters and functions, or to modify existing parameters and functions. Thus, when the supply system 10 includes a user programmable digital processor, the user can readily add, delete, or adjust control coefficients for a particular feedback algorithm to select or optimize system parameters by inputting appropriate selections or more detailed data to the control unit, eg., via a keypad or comparable input device.

The user input device 62 can receive user input via a variety of modes, including manual input (eg. via user operation of a keypad, touchpad, joystick, roller or pen selector), voice input, or optical input such as finger print or other image input coupled with optical recognition processing by the control unit 34). Using one or more of these input modes, the user can actively or passively input his or her identification into the system, eg., by entering a pre-set or user-programmed user code through a keypad or other manual input device, or passively inputting an audio or optical signal recognized by the controller as a user-identification signal.

The user input device 62 can be variably constructed and integrated with the control unit 34 to accommodate a variety of system designs and to allow for user selection or modification of a numerous system parameters and functions. Thus, a primary input by the user will be to select an on/off mode of the supply system, and to select a designated outlet (eg., shower or bath) for delivery. These and other selections may be accomplished, eg., by depressing a dedicated key (eg., on/off key) on a keypad, or by entering a user code on the keypad to simultaneously activate the system and send a user-identification signal to the control unit. On receipt of the latter signal, the control unit activates pre-set system parameters and functions, as described in further detail below. Yet another means of actuating or controlling the supply system is by audibly or optically transmitting a signal to activate the system and/or to signal user identity to the control unit, without manual input (eg., using known voice recognition or image recognition technology available for integration with the input device and control unit).

Other basic user input operations within the gas and fluid supply systems of the invention allow for user selection and fine tuning of desired flow and temperature parameters. Thus, within the exemplary fluid supply system 10 of FIG. 1, a user may input a desired set temperature value into the input device 62, eg., by depressing a temperature set key and thereafter depressing a series of numbered keys corresponding to a desired set temperature.

Alternatively, selection of a desired set temperature can be selected automatically through pre-programming or user programming of the control unit 34 interfaced with the user input device 62. For example, the input device may be configured to allow simple user programming to tailor system parameters and functions to the desires of specific individuals who frequently use the system.

In one such embodiment, the input device 62 is activated and a user code or other user-identification signal is input manually or passively. Thereafter a program key is selected which signals the control unit to store one or more subsequently selected system functions and/or parameters into memory for subsequent automatic recall by the control unit 34 upon repeat entry of the same user code or user-identification signal.

Thus, after the program key is selected the user may select, for example, a temperature function key and thereafter enter a desired set temperature value. To set the desired temperature in this manner (or to select any other system function or parameter where a range of possible selections exists), a simple numerical selection can be entered, eg., by depressing one or more coded or numbered keys designating the desired function or numeric parameter. Alternatively, the user input device 62 may allow the user to scroll or shift among a list or menu of selectable functions and parameters (eg., using a simple, bi-directional toggle key, or more elaborate, multi-dimensional menu-based input template). In this manner, the user selects a desired set temperature value and can then close the user programming function (eg., by depressing an "enter" key or pressing the program function again).

In response to this input, the control unit 34 stores both the temperature function selection and set temperature value into memory, whereafter the set temperature input is automatically recalled upon subsequent entry of the same user identification signal, causing the control unit to send user-specific command signals (eg., to the hot and cold water stepper motors 22, 24) to regulate the designated functions and parameters.

Until the program function is closed, the user may continue to enter a range of new or modified system functions and parameters. For example, the user may select a flow rate function key, followed by entry of a desired set flow rate. In the same manner, pre-selected volumes or time periods can be selected to pre-set the volume or duration of system operation upon activation by a specific user, eg., to draw a pre-determined bath volume, provide an overflow safety function, or to regulate conservation of water.

In one such exemplary input model, the user may select a volume function key and enter a desired set volume for a single use period (this data may also be programmed into controller memory and recalled during future uses if entered when the user programming function is open). After receiving this set volume data, the control unit 34 processes the data and generates an appropriate signal, eg., a signal transmitted to the flow control valve stepper motor 48 to close down the flow control valve 50 when the set volume is reached. Preferably, this shut-down signal is generated or received differentially from an emergency shut down signal (eg., in response to a scalding temperature detected in the mixed fluid), to provide a gradual, rather than an abrupt, cessation of flow. More preferably, the shut down signal sent by the controller when a desired set volume is reached is preceded by one or more warning signals transmitted by the controller to the user display 64, which trigger a audible and/or visual warning to the user that system shut down is imminent.

Design and construction of the user input 62 for use within the gas and fluid supply systems of the invention will vary considerably depending on the design and functions of the particular system. In accordance with the foregoing description and related discussion herein, design and construction of a keyboard or other input device for controlling a domestic water supply, particularly for bathing use, will be a matter of routine. Likewise, other user input designs for different systems within the invention will be recognized and readily implemented by the skilled artisan in accordance with the teachings herein.

The design and programming of the user input device 62 and control unit 34 of the invention also provides for certain function/parameter commands to override potentially competing commands. For example, these components of the system are configured and programmed to favor set temperature maintenance over set flow rate or volume maintenance. In this manner, if available hot water from the hot water source reaches a state of deficiency (eg., as signalled by the hot water supply valve status sensor 40) to maintain both temperature and set volume or flow levels, the controller will disregard or de-prioritize the set volume or flow signal to favor maintenance of the set temperature. Likewise, the system is designed to favor safety shut-off inputs (eg., signals designating that a mixed fluid temperature or total volume delivered by the system exceeds a pre-set maximum value) over competing inputs (eg., a signal to increase flow or temperature). Dominant over all system inputs is the system shut-off signal on the user input, which stops delivery from the subject outlet under all control conditions.

Dynamic intrinsic control is also provided within gas and fluid supply systems of the invention to alter system functions and parameters in response to non-user (eg., environmental) signals and/or based on intrinsic signals besides those provided by the above described sensors. For example, dynamic control of a domestic or commercial fluid supply system beneficially incorporates a temporal signalling function, which may be entirely external to the control unit 34 or integrated therewith. Thus, in the embodiment of the invention illustrated in FIG. 1, the control unit 34 incorporates a programmable time clock and year calendar that provides for even broader control of system functions and parameters.

In one aspect of the invention, the programmable time clock and date calendar provides a display signal whereby the current date and time are received and displayed on the user display 64 of the user interface 60 as a default display (eg., when the system is off or no input function is activated).

In more specific embodiments of the invention, the time clock and calendar allow chronologically programmed control of any relevant system function and/or parameter. For example, in the embodiment shown in FIG. 1, a user may select a time function key when the program function is open to pre-set a desired time of day when designated system functions and parameters are to be implemented. Thereafter, the user can program designated system functions and parameters as outlined above, entering this combined, chronologically indexed data into the memory of the control unit 34 for automatic recall at the designated time.

Thus, in synchrony with a user's activity schedule, the system can be programmed to activate at a selected time, and thereafter automatically adjust mixed fluid temperature, flow rate, and/or volume to achieve designated set values, eg., to provide a pre-conditioned shower ready for entry at a set time of morning, or ready a bath at a set time in the evening.

Alternatively, the system can be programmed on an hourly, daily, weekly or even seasonal basis to regulate water temperatures in designated parts of the system, eg., for maintenance and conservation purposes. For example, during periods of low use (eg., off-peak hotel use or mid-day and overnight residential use), the system can be chronologically programmed to lower a maximum temperature of the hot water source 12, e.g., by signalling a hot water thermostat stepper motor 68 to adjust a thermostat 70 of a hot water heater 72 providing the hot water source 12 to a lower thermostat set temperature (see, FIG. 5). Conversely, during evening or winter periods subject to a high risk of pipe freezing, the system can be pre-set to raise a maximum temperature of the hot water source 12.

These types of maintenance and safety functions and parameters can also be regulated by other dynamic intrinsic control means, for example by controller processing of signals from selected environmental sensors. Thus, additional temperature sensors can be integrated with the system to sense changing temperature conditions in the system environment, eg., to signal the controller to regulate hot or cold water supply temperatures. In one such example, the system may be actuated and set to maintain low level flows to prevent pipe freeze when a low threshold set temperature is reached.

Optional input modes are also provided which enable remote control of gas and fluid supply systems of the invention. Remote control can be provided for various system elements, e.g., flow control and shut-off valves, flow and temperature sensors, etc., and can employ a variety of conventional signal transmission/reception/control devices 74. For example, remote control of system functions may employ conventional infrared (IR), radio frequency (RF), internet, intranet, direct connect remote access, satellite, or laser devices for signal transmission, reception and integrated control. In one embodiment, the control is similar to a standard IR television remote but incorporates an electronic display with a pull-down menu allowing the user to program various system functions and receive data in accordance with the system designs and methods of the invention.

Alternatively, remote system connection and control can be achieved through internet linkage, where the system operator can program a full range of system functions and also receive data, for example, data detailing system settings and sensor readings. Thus, the user can remotely monitor and control the system, e.g., by altering program settings to lower a hot water heater temperature while on a vacation or business trip. To facilitate internet monitoring or control, an internet site is provided which allows users to copy a blank (filter) form with which to receive data and program system parameters through the internet, e.g., to allow remote programming of shower times, to add new users, to track the number, time and/or cost of showers, and to identify which users have activated the system. Alternatively, internet connection allows for detection of problems within the system, e.g., leaks, undesired temperature or flow changes, etc., and can automatically provide a message and/or default control signal to remedy the identified problem, e.g., advising the signal recipient to enter a system shut-off command or noting that such programming command has already been entered and the resulting system change verified.

Intranet access and control is also provided, for example in commercial hospitality settings, the system is connected via a main-frame computer which can independently or coordinately monitor and control multiple systems or subsystems, e.g., shower control systems for a large number of individual rooms as well as central systems for monitoring and/or recirculating hot water and other fluids.

Either internet or intranet access and control can be mediated via toll-free phone services which allow users to telephone in requests and/or program system functions via touch tone phone.

Yet another system input mode involves storage of input data on a personal information storage template 76 (e.g., a hard disk, floppy disk, zip or jaz drive, cd-rom, eeprom, or magnetic or optical data storage device such as a magnetized data storage card). Data stored on the personal information storage template can be transmitted or downloaded into the system via any of a number of well known data transfer means, e.g., through serial, parallel, modem, internet, or intranet computer transfer, or satellite, optical, infrared, ultrasound, radio frequency (RF), or cellular data transmission.

In one preferred embodiment, personal data for inputting to the fluid or gas control system of the invention is stored by a conventional magnetized data storage card which serves as the template 76. Information stored on the card template is transferred directly into the system memory or may be input to a central data base serving a large number of independent systems. For example, one personal storage template, the KOMFORT CARD™, provides for personal data storage and transfer to service hospitality industry patrons throughout a chain of affiliated facilities, e.g., a national hotel chain. The KOMFORT CARD™ stores and transfers a range of personal information directly or indirectly to the fluid control system (e.g., a hotel restroom installation), including, e.g., dates of hotel stays, selected times for activation or adjustment of fluid control parameters such as activation of bathwater flow or adjustment of shower temperature. In addition, the KOMFORT CARD™ may store a wide variety of additional personal information for input into a separate or common memory and/or control unit 34. For example, the personal information storage template may store information regarding selected times for wake up calls, desired room temperatures, selected times for meals, selections for dry cleaning, meals, rental car and entertainment options, and accommodation preferences such as non-smoking rooms.

Another optional input mode allows for system input from an external data processing device 78, such as a personal computer, electronic day planner, or computerized building management system. This input mode can be employed separately or integrated with the data input and storage methods and devices described above. Use of an external data processing device allows a user to communicate instructions to the system from the same or separate location, as well as to readily transfer data between separate systems. In addition to providing for data input, an external data processing device can also be used to generate new input selections, download information from the system sensors and/or memory, and reprogram system functions and parameters remotely for simultaneous or subsequent loading into the same or different system. Thus, a personal computer may be used as a software development system for the microprocessor program incorporated in the control unit, adding increased utility and flexibility to the system.

Although the system control unit 34 provides for extensive data storage and management, integration of the system with a personal computer or other data processing device allows for expanded data storage and management possibilities. With or without external computer support, the system allows for storage and processing of an extensive array of data. In one such application pertaining to residential and commercial water use, water volume and/or temperature values may be continuously recorded into the system (or external) memory. Alternatively or additionally, this data can be recorded (or later processed) to determine use by a particular individual, or during a designated use period. This data can thus be used to track use to facilitate budgeting and conservation, which will be particularly useful in the context of commercial hospitality accounting and/or billing procedures.

Use of a personal computer or other external data processing device 78 can take the place of the system user interface 60 and allow a user to access the system and retrieve data and/or program the system remotely. The external processor may be linked directly to the control logic that programs the data storage (memory) with user specific selections and control commands. New selections and commands can be routinely programmed, e.g., to add a guest user and program in that user's desired system functions and parameters as described above. In more specific embodiments, the external processor allows inputting, downloading, compilation and processing of specific and/or cumulative system data, e.g., to plot past or projected usage profiles for individual systems, integrated systems, or particular individuals, to automatically adjust system parameters (e.g., to lower system water temperature over night or during programmed weekend or vacation periods), or to second-task system data, e.g., to generate records or invoices based on processing of cumulative system data.

In preferred embodiments, an external processing function is integrated with the system and accepts and inputs data to and from a personal storage template, e.g., a KOMFORT CARD™. This allows the user to download and upload new information from anyplace that has computer access, e.g., via internet transfer, or, alternatively access and control can be mediated via a toll-free phone services which allow users to telephone in requests for programming or themselves program system functions via touch tone phone.

In more specific embodiments, the system processing unit or external processing unit allows for system "learning" using advanced control logic. Thus, the system can identify and remember which users use the fluid control system at particular times and days. The system will automatically adjust temporally-adapted system functions and parameters according to this schedule to approximate pre-selected system functions and parameters for that individual. For example, the system will adjust shower water temperature to achieve a pre-selected temperature at the user's habitual use time. If this individual schedule changes the computer will recognize the change and automatically inquire via the user interface 60 whether a new schedule should be programmed. The system can also be programmed to "learn" a wide range of additional memory functions, e.g., to remember how long it takes to heat water in the system based on present temperature and hot water heater temperature, and/or to adjust this remembered heating time in response to external or internal temperature changes—automatically or based on further processing of past temperature and heating time data.

In conjunction with the aforementioned user input operations, the user display 64 provides a commensurate array of display functions and information to facilitate user monitoring of input selection and system status. For example, in the embodiment of the invention shown in FIG. 1, the user display indicates the on/off status of the system, user identification (eg, name), if entered, and current system parameters detected by all relevant sensors (eg., mixed fluid temperature sensor 36, hot water temperature sensor 54, flow sensor 46, compositional sensor 52, etc.)

This information can be displayed in a visual readout format, eg., on a backlit LCD display, either in response to user call-up (eg., by user selection of a labeled display key or specified display code), or by automatic, sequential display of system parameters. Regardless of the default display configuration, whenever a selected function key (e.g., mixed fluid temperature, flow to outlet) is selected by a user, the present sensor reading(s) corresponding to that function are preferably displayed.

In addition to visual text and numerical display modes, the user display 64 can be adapted to provide information in a range of alternate visual formats (eg., using symbols or alternative numerical systems), including optional foreign language visual displays. In addition, audio and tactile displays can be employed to facilitate use of the control system, particularly by persons who are hearing or visually impaired.

Other system functions and parameters which are optionally presented by the user display 64 interfaced with the control unit 34 include running or static time displays corresponding to an estimated time period before a set temperature is reached. Correlated with this control/display function, the system also displays system ready signals, eg., flashing lights or audible signals, which notify the user when one or more set parameters (eg., desired temperature, flow, volume) have been reached. Also displayed are other chronographic values, such as the estimated time remaining at a desired temperature (determined by the control unit 34 based on, eg., coordinately processed signals from the hot water temperature sensor 54 and flow sensor 46). Related to this function, the system may also display additional supply indicator values, for example the estimated percentage of mixed fluid comprised of hot or cold water (determined by the control unit based on, eg., coordinately processed signals from the hot and cold water supply valve status sensors 40, 42).

Power requirements of gas and fluid supply systems 10 according to invention vary with respect to the particular system design and function, but are generally minimal. In the exemplary domestic fluid supply system of FIG. 1, a low voltage current runs the control unit 34 and allows it to send and receive signals to and from the user interface 60 and the various sensors and actuator means (eg., valve and thermostat stepper motors). Normal household current may be used to operate the various actuator means. Preferably, a converter is used to supply DC power at a standard voltage such as 12 or 24 volts DC. Preferably, the power supply for the system includes an auxiliary power source 80, for example rechargeable batteries maintaining a supply of 5 volt operational power in the event of an interruption in the main power supply. In accordance with this aspect of the invention, a battery charge sensor 82 is also provided which signals via the user display 64 the charge status of the batteries and optionally sounds a low charge alarm in the event of low battery drain. Details of construction of the power supply will be readily apparent to the skilled artisan in accordance with the teachings herein.

Figure 2A:
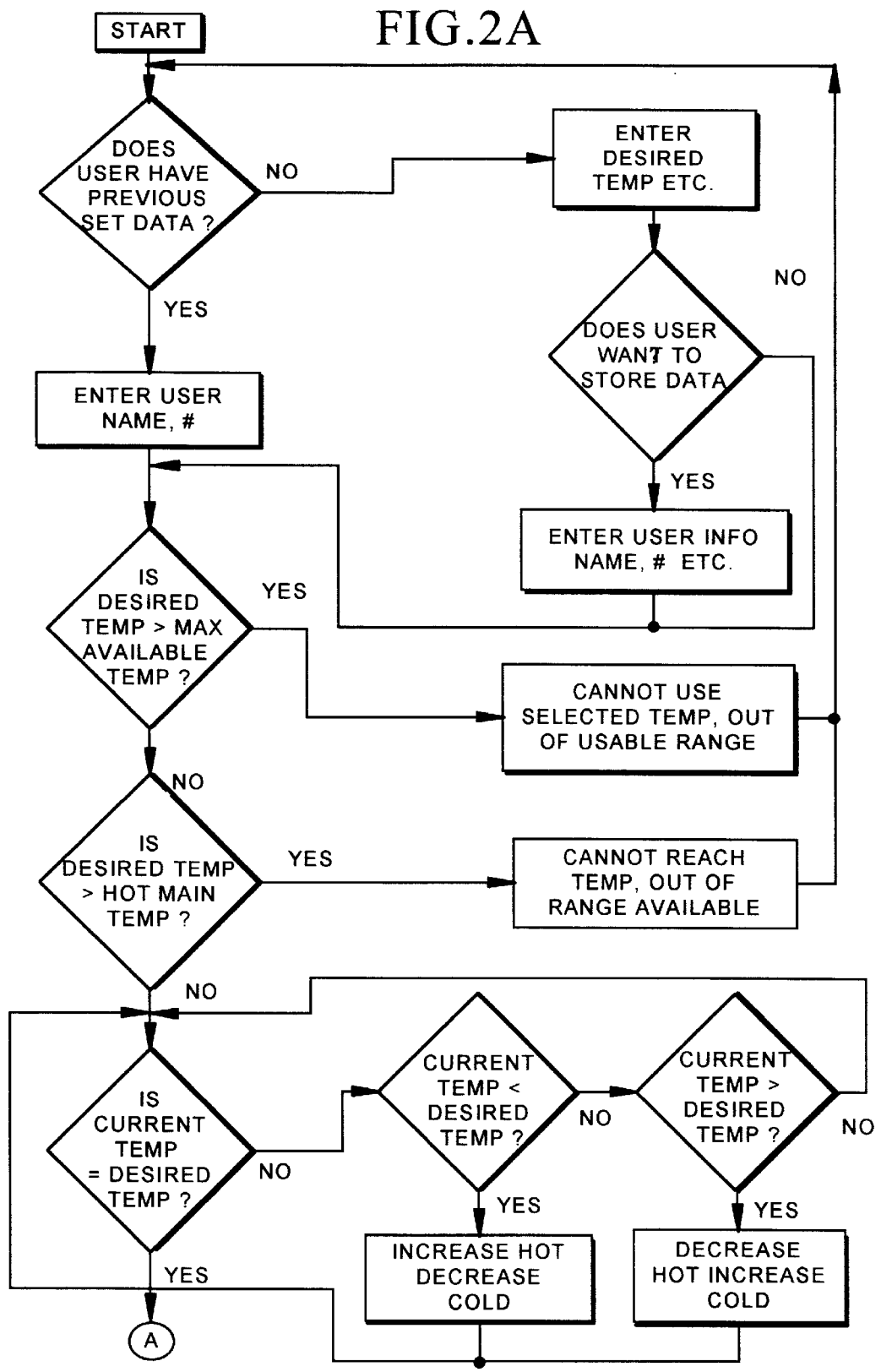
FIGS. 2A and 2B provide a continuous flow chart exemplifying operation and control of a fluid or gas supply system of the invention.
Figure 2B:
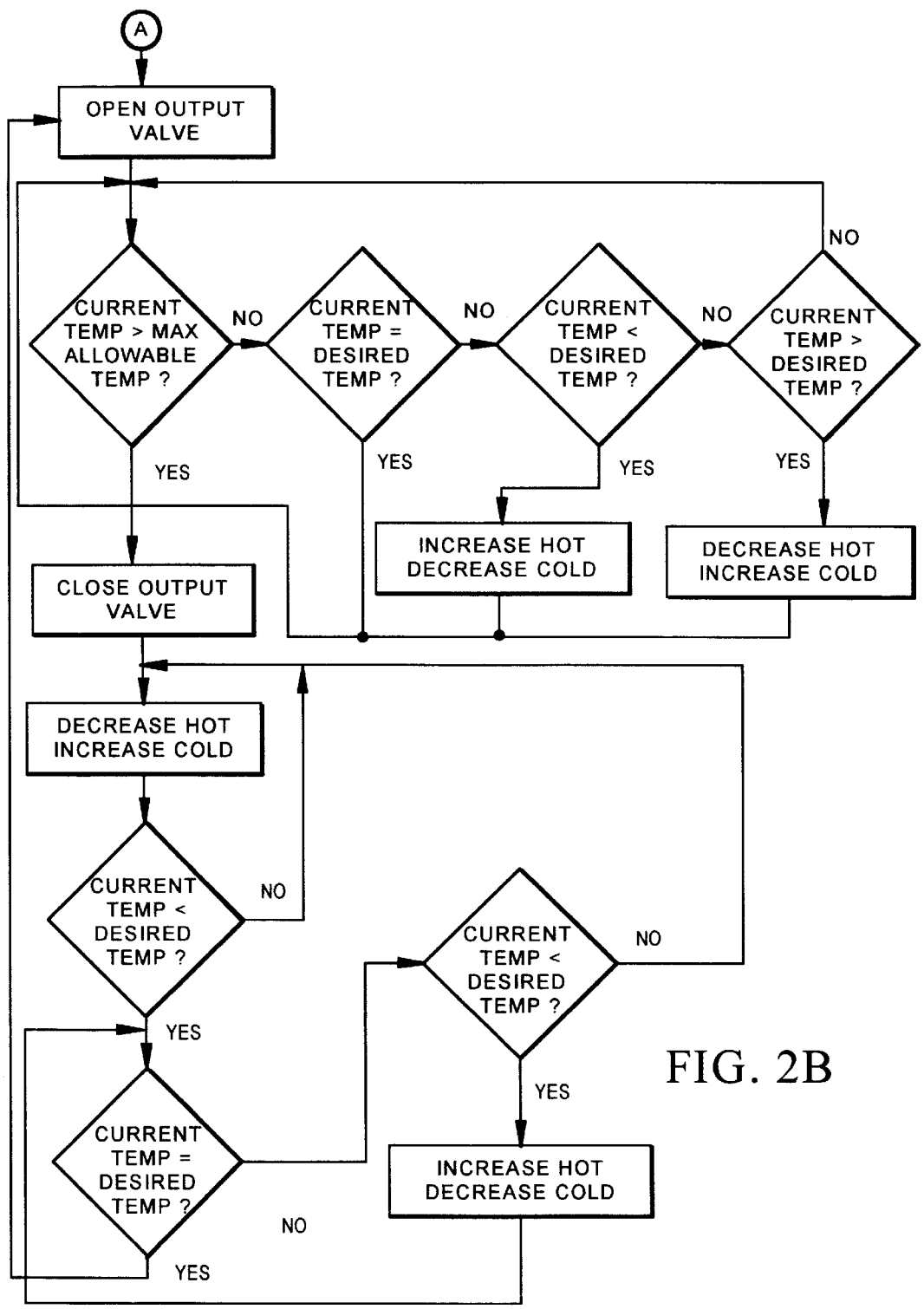

FIGS. 2A and 2B comprise a flowchart as an aid to understanding function and control of the gas and fluid flow systems of the invention. FIGS. 2A and 2B are a continuous flow chart (flow direction marked by arrows) that exemplifies preferred system parameters and control functions described above.

Figure 3:
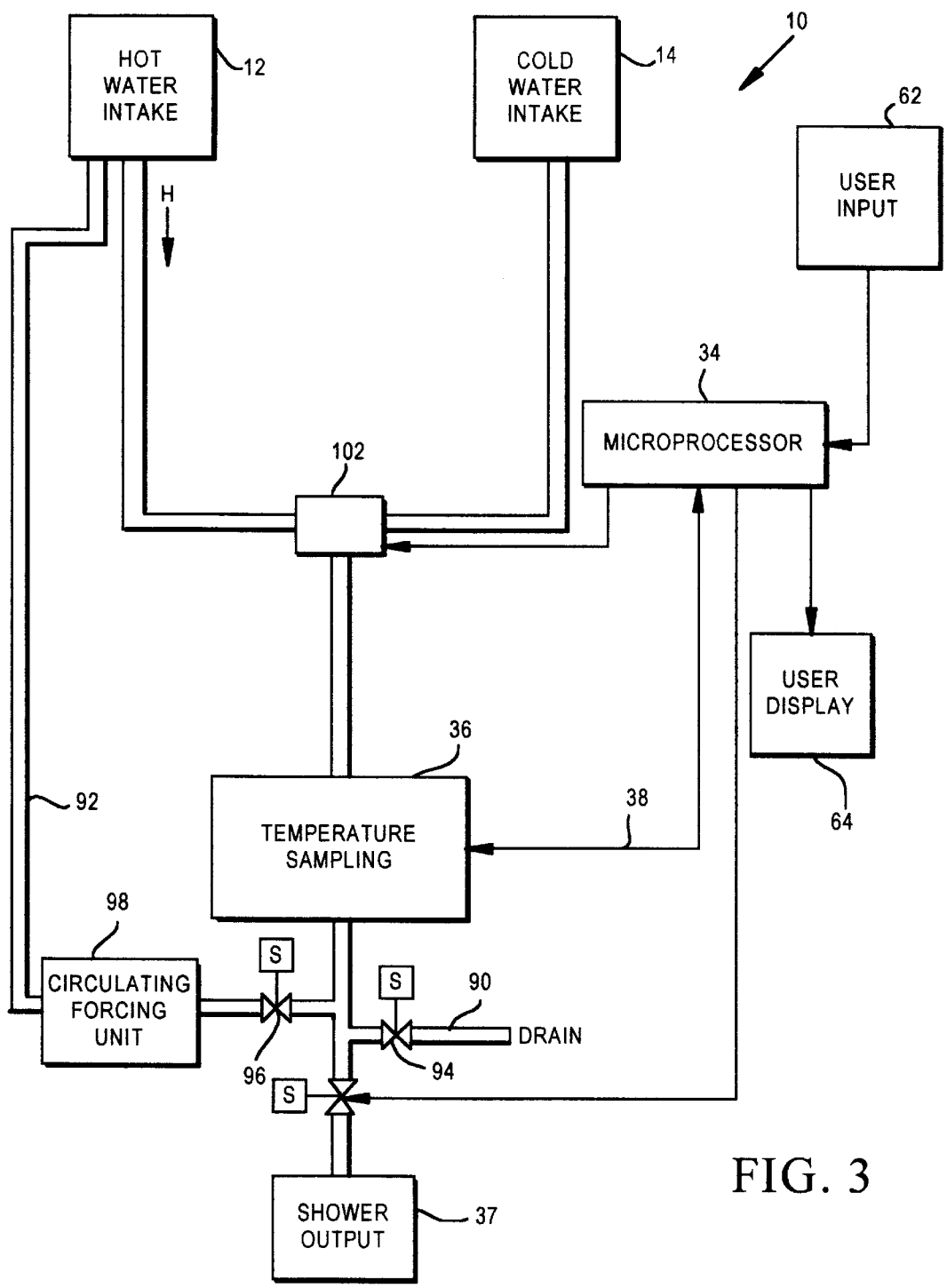
FIG. 3 is a schematic illustration of a domestic fluid supply system employing the concepts of the invention and incorporating a closed recirculation design.
Figure 4:
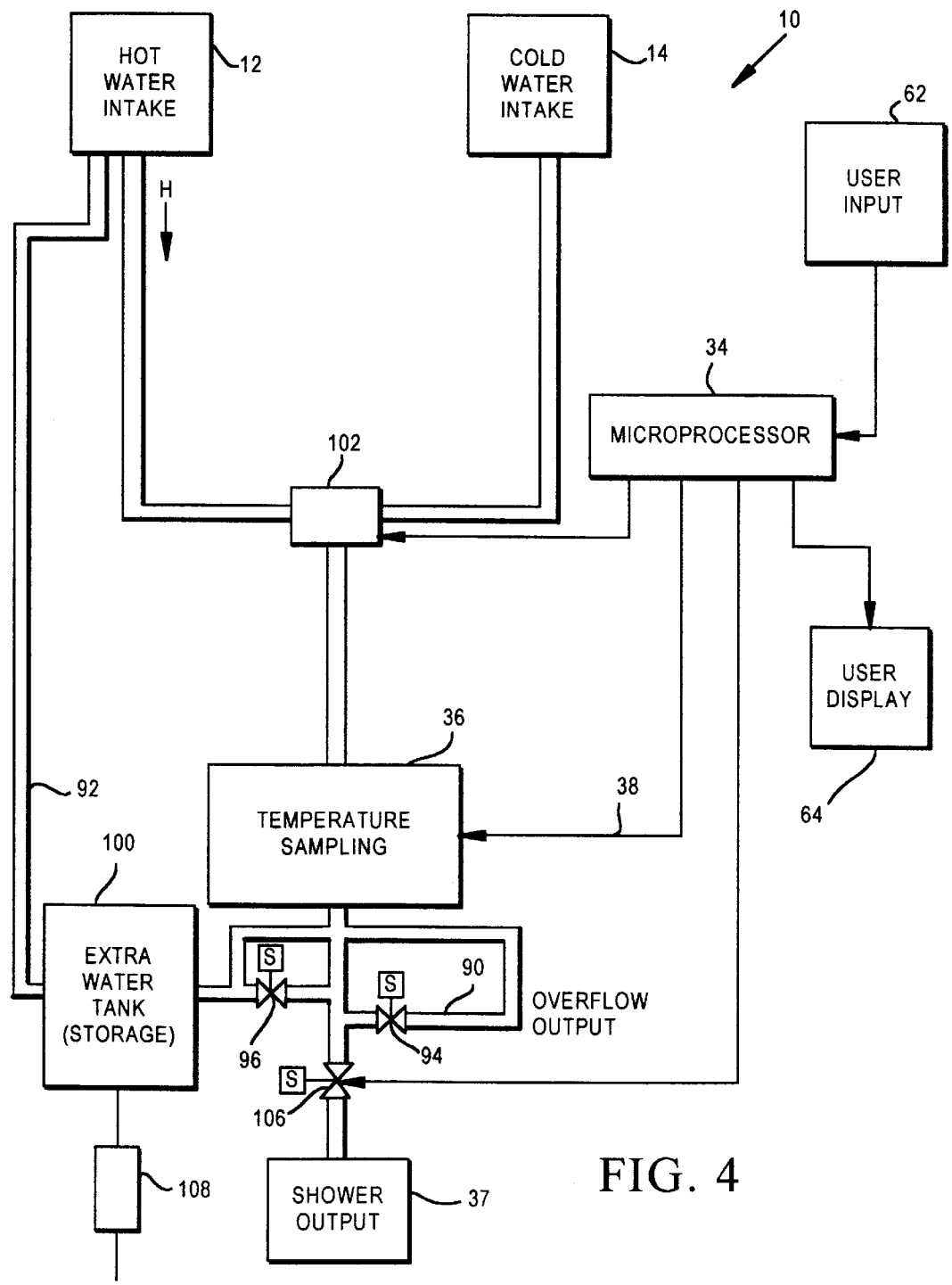
FIG. 4 is a schematic illustration of a domestic fluid supply system employing the concepts of the invention and incorporating a fluid storage and recycle design.
Figure 5:
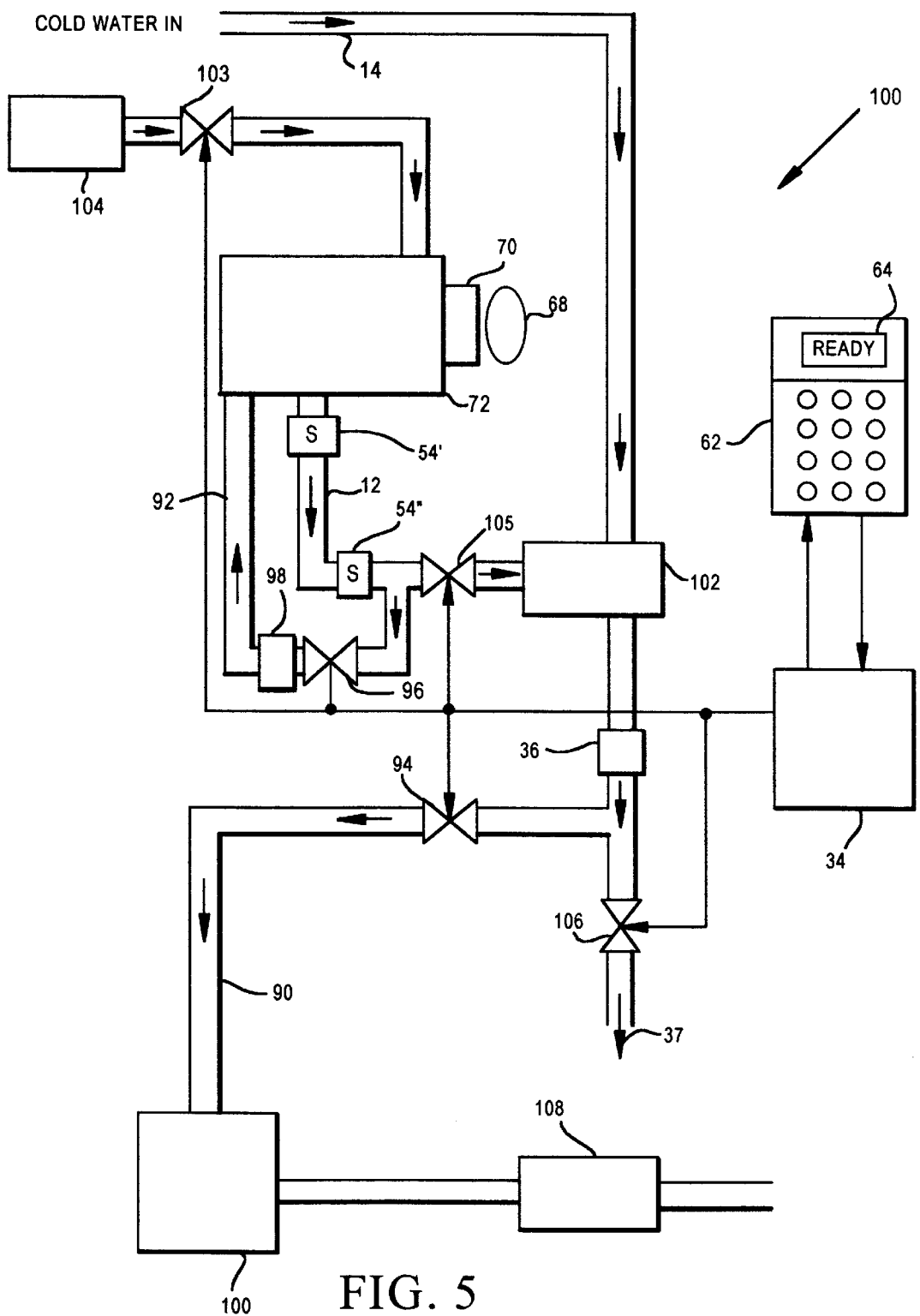
FIG. 5 is a schematic illustration of a fluid supply system employing the concepts of the invention and incorporating a hot water recirculation and/or storage and recycle design.

In alternate embodiments of the invention, gas and fluid supply systems incorporate recirculating, purging and/or recycling functions to achieve various desired purposes (see, e.g., FIGS. 3–5). In a typical fluid supply system, priming of the system to achieve a desired set temperature at the system outlet 37 will ordinarily require expunging of excessively hot or cold fluid from the system to permit drawthrough of fluid to the system outlet that has been mixed to the desired set temperature. This expunging may be achieved through the system outlet, but is more preferably directed through an overflow output 90 or into a recirculation pathway 92. The overflow output may be a simple drain connected to the system by a pipe. Routing of system fluid through the overflow output can be achieved using an overflow valve 94 or recirculation valve 96 designed and controlled as described for other system valves above. Recirculation of system fluid is especially desired to prevent waste expulsion, particularly of heated fluid, and can be facilitated by providing a recirculation forcing unit 98 to pump fluid through the recirculation pathway. The recirculation pathway can direct fluid back into the main fluid system, e.g., by feeding back into the hot water source 12, or may be shunted to a storage tank 100 (see, e.g., FIG. 4) where it may be accumulated and held for later recirculation into the system via the recirculation pathway 92 or diversion outside the system for secondary use.

More detailed embodiments of the invention employing a recirculating flow function include a hot water recirculating fluid supply system 100 (see, e.g., FIG. 5). As is true for the systems shown in FIGS. 3 and 4, this system employs a single mixing valve 102 for combining fluid from the hot water source 12 and cold water source 14. A main water supply valve 103 is connected via a control connection, e.g., a wire, to the processing unit 34 and regulates flow between the incoming water main supply 104 and the water heater 74. A local hot water valve 105 regulates flow from the hot water supply toward the system output 37. A recirculation valve 96 regulates hot water recirculation through the recirculation pathway 92 back to the water heater. An overflow valve 94 and output flow control valve 106 are also provided. Sensing of hot water temperatures is achieved close to the water heater by a first hot water temperature sensor 54' and close to the mixing valve 102 by a second hot water temperature sensor 54". The system operates as follows.

Preferred initial system settings for the main water supply valve 103 is open, recirculation valve 96 closed, local hot water valve 105 closed, overflow valve 94 closed, output flow control valve 106 closed and mixing valve 102 closed. As will be apparent to those skilled in the art, these initial settings are only exemplary, and valve closure and opening can be alternatively adjusted at different times and for different operations by the microprocessor control unit to achieve specific applications. Typically, when a desired set temperature selection is made the control unit will close the main water supply valve and open the recirculation valve, and the forcing unit 98 will force hot water to recirculate back to the hot water tank 72 until the water temperature at the first hot water temperature sensor 54' is approximately the same as the water temperature at the second hot water temperature sensor 54". At this point, the forcing unit is turned off, the recirculation valve 96 closes, the main water supply valve opens, the overflow valve 94 opens, the local hot water valve 105 opens, fluid output is directed out the overflow output 90, the mixing valve 102 adjust the cold and hot water mixture until the temperature at the mixed fluid temperature sensor 36 equals the desired set temperature. At this point, the overflow valve 94 closes, and the output flow control valve 106 opens delivering water at the output 37 at the desired set temperature. As a safety mechanism, if the temperature at the mixed fluid temperature sensor 36 equals or exceeds a maximum safe set temperature, then the output control valve closes to prevent burns and the overflow valve opens to divert fluid to the overflow output 90. The mixing valve(s) adjust the hot and cold water ratio to lower the temperature. When the temperature at the mixed fluid temperature sensor 36 equals the desired set temperature fluid flow returns to the output via closure of the overflow valve and opening of the output control valve. Optionally, overflow can be routed to a storage tank 100 which can serve as a secondary fluid source, e.g., by routing stored water through a filter 108 to provide a secondary supply of filtered drinking water.

In yet another embodiment of the invention, the gas fluid supply system is a central heating and cooling system that provides for the achievement of different temperature settings in multiple rooms. Currently central heating has one central control panel where a desired temperature is set. Once the actual temperature of the room where the central control panel is located reaches the desired set temperature the heating/cooling system will turn off, even though other rooms served by the system may differ substantially in temperature. Furthermore, different occupants in different rooms often wish to select different set temperatures, e.g., due to personal preference or by virtue of different activities that may be undertaken (e.g., exercise versus sedentary work) in a particular room. In addition, the invention allows for selection of particular set temperatures for separate rooms to conserve energy when selected rooms are unoccupied or scheduled for a particular activity, e.g., sleep.

The gas control system of the invention provides for selection and pre-programming of different temperature settings for different rooms, including selection of settings for each room that will change at pre-set times and/or dates.

Each room has a control panel to adjust and program temperature setting(s) for that room, while a master control panel can be added to desired rooms for limited or total control of other rooms in a building. For example, a limited master control panel can be used for guesthouses where the panel has control of the entire guesthouse but has no control to the main house, whereas the master control panel in the main house would be able to control the guesthouse. According to this design, if a house is equipped with an air conditioner and a heater, part of the house could be using the heater while the air conditioner could be operating in another part of the house. Also in accordance with the above described control systems, the gas supply system of the invention can process and remember a variety of heating/cooling system parameters, for example to calculate and remember the time it takes to heat one or more rooms to optimize control and conserve energy resources. The heating/cooling system can thus track and process selected system functions and parameters, for example the average temperature in a room, the amount of heating or cooling time expended in a room, differences between outside temperatures, adjacent room temperatures, and a selected room temperature, etc.

In accordance with the above described fluid control systems, the heating/cooling gas supply system of the invention employs one or more temperature sensors, flow sensors, and/or flow control mechanisms (e.g., adjustable valves or baffles within heating ducts). There may be one master control user input or multiple inputs in separate rooms. Room temperature sensors are preferably placed on an opposite wall from a heating/cooling duct that outputs into the subject room, or at least far enough away from the heating duct so that the hot/cold air is not directly blowing on the sensor.

The room temperature sensor communicates temperature data to the control panel via a wire, or other signal means (e.g., IR, RF, etc.) as described for the fluid control system above. The room temperature sensor is preferably placed at eye level, about 5' above the floor, but can be placed in a variety of other locations. The sensor detects current actual temperature and sends data to the processor which determines when is or is not equal to the desired set room temperature.

Electronic controlled valves or baffles are placed within heating ducts or ports (e.g., heat register) that can open and close the duct or port or incrementally adjust gas flow from the heating and cooling source (e.g., furnace or air conditioner) to the desired room.

Desired set temperatures for multiple rooms can be input via a user input at a master control panel, or at a local control panel in a particular room to change the desired temperature for that room. Local control panels are linked to the central control panel(s), where all system data is stored. Limited control panel(s) located in desired rooms can set the desired temperature for selected rooms, e.g., adjacent rooms.

The master control panel holds all data for the different rooms. This data is input into the central processor as described for the fluid control system above from the different room sensors, e.g., when the actual temperature is not at the desired temperature. The processor also sends data to achieve new desired temperature settings, e.g., when a user changes the desired temperature or when the desired temperature changes due to a timed program change. Each control panel features a user display that displays the actual room temperature, the desired or set room temperature, and such additional data as time of day, external temperature(s), etc. The control panel includes a user input with analogous features for input of information and system programming (e.g., user identity, set temperature, time-dependent temperature changes, etc.)

In preferred embodiments the master control panel prompts the user to enter a pass word, whereby only an individual who knows the password can alter current temperature settings or change the programming of the system. The master control panel also tracks temperatures in all rooms, and can provide a processed display, e.g., a graphic display, based on cumulative values, e.g., to plot past changes in temperature versus time, to project the time required to heat a particular room to a desired set temperature based on current room and external temperature and internal system sensor input, as well as based on a variety of "learned" processor functions, e.g., an adaptive, temperature versus time value, program.

Installation of the gas supply heating and cooling system of the invention preferably incorporates mounting of the sensors on interior walls with wires connecting the sensors to a conventional power supply and to the master central control panel. However, the sensors can be wireless and, optionally, run off batteries. The master and individual control panels can have the temperature sensor built in or external thereto. The control panels can be hard wired or wireless.

The electronically controlled valves can be placed inline with the heating or cooling ducts having one electronic valve per room, which is desirable for both new-construction and re-models. Alternatively, electronic valves can be incorporated within duct ports or registers, making installation much easier in the case of re-model construction.

Exemplary temperature sensors for use within the gas supply heating and cooling systems of the invention include the DS1620, DS1820, and DS1624 available from Dallas Semiconductor (Dallas, Tex.). An exemplary microcontroller for use in the master control panel is a Dallas Semiconductor DS87C530 microcontroller. Numerous types of electronic valves can be employed, which preferably use existing relays to open or close the valve.

Figure 6:
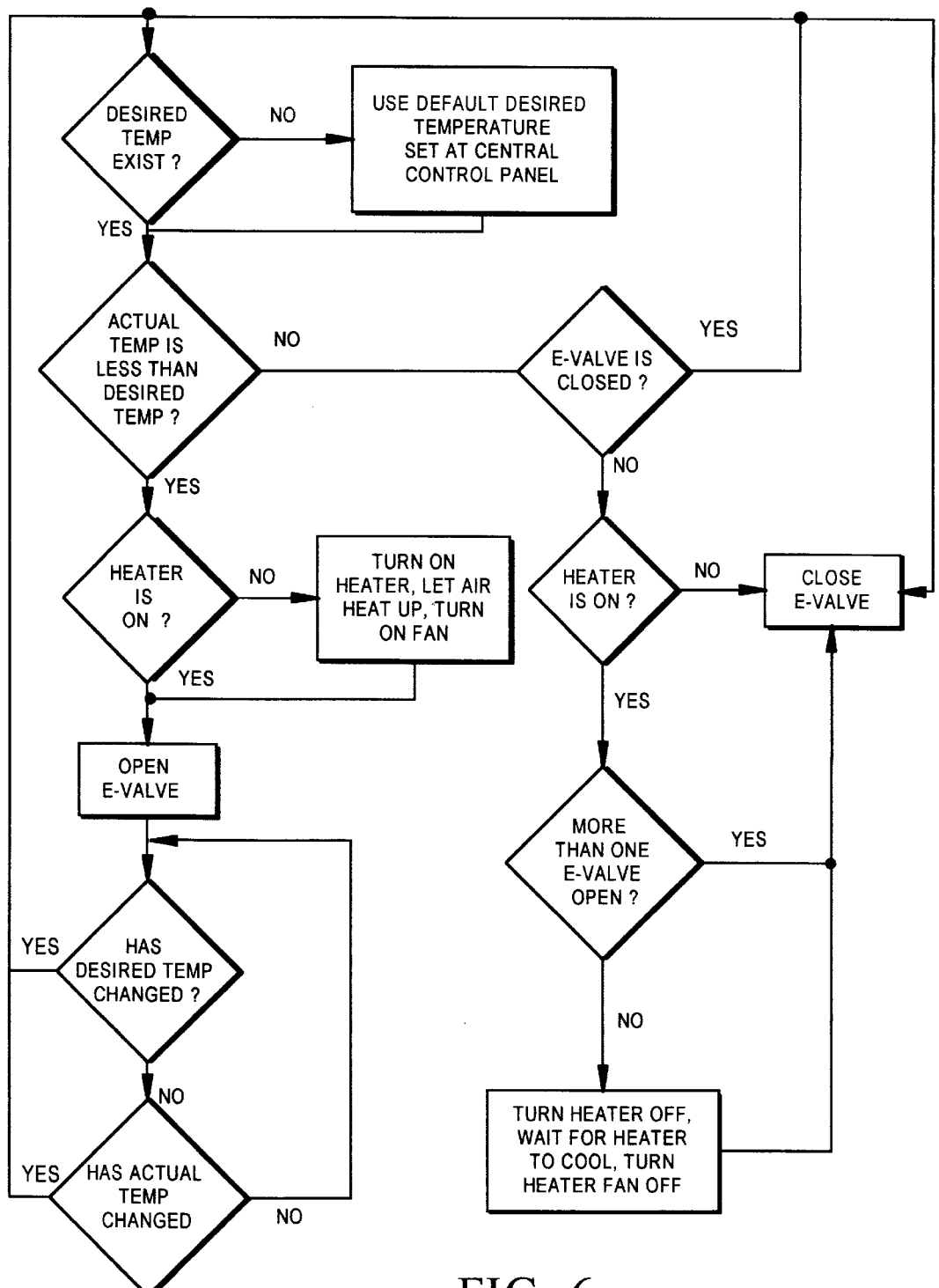
FIG. 6 is a flow chart illustrating operation and control of a gas supply system of the invention.

FIG. 6 provides a flowchart as an aid to understanding function and control of the gas supply heating and cooling system of the invention.

Although the foregoing invention has been described in some detail by way of illustration and example for purposes of clarity of understanding, it will be obvious that certain changes and modifications may be practiced within the scope of the appended claims.

What is claimed is:

1. A fluid delivery system for controlling fluid temperature, flow rate and volume at a system outlet comprising:
   a fluid supply control valve for regulating flow of a first fluid and a second fluid from corresponding first and second fluid sources into a mixing port, wherein said first fluid has a different temperature from said second fluid;
   a fluid supply control valve actuator operatively connected to said fluid supply valve for actuating opening and closure operations thereof;
   a thermosensor thermally coupled with said mixing port to sense an estimated present temperature of a mixed fluid within said mixing port;
   a fluid control valve for regulating flow of a mixed fluid flow at said system outlet;
   a flow control valve actuator operatively connected to said flow control valve for actuating opening and closure operations thereof;
   a user interface including user input means for selecting a set temperature, flow rate and volume of fluid at said system outlet and user display means for displaying one or more system functions or parameters;
   system control means for receiving signals from said thermosensor and user interface and for processing said signals to generate appropriate control signals to control said fluid supply control valve actuator(s) and said flow control valve actuator means to achieve programmed or user-selected set temperature, flow rate and volume at said system outlet; and
   a remote system monitoring/control device operable for bidirectional data transmission and reception between said remote monitoring/control device and said system control means and/or system sensor(s) for remotely monitoring and controlling said one or more system functions or parameters, wherein said remote monitoring/control device operates to remotely generate signals to remotely select said one or more system functions or parameters, and wherein said remote monitoring/control device also operates to receive signals from said system control means and/or said one or more system sensor(s) to remotely monitor said one or more system functions or parameters.

2. The fluid delivery system of claim 1, including first and second fluid supply control valves for regulating flow of said first fluid and said second fluid and first and second fluid supply control valve actuators operatively connected to said first and second fluid supply valves for actuating opening and closure operations thereof.

3. The fluid delivery system of claim 1, wherein the flow control valve actuator is selected from an electric, pneumatic, hydraulic, or magnetically driven control motor.

4. The fluid delivery system of claim 1, wherein the remote system monitoring/control device sends and receives signals to and from the system control means and/or system sensor(s) via an electrical, infrared (IR), radio frequency (RF), internet, intranet, direct connect remote access, satellite, or laser control connection means.

5. The fluid delivery system of claim 1, wherein said remote monitoring/control device comprises a personal computer, day planner, or main-frame computer/server.

6. The fluid delivery system of claim 1, wherein the thermosensor incorporates memory means for entry and storage of user-defined temperature settings.

7. The fluid delivery system of claim 1, wherein the user interface input is a remote user input selected from a keypad, touchpad, joystick, roller, pen selector, voice input, or optical input integrated within the remote system monitoring/control device.

8. The fluid delivery system of claim 1, including one or more additional sensors connected to said system control means and/or to said remote system monitoring/control device selected from a hot water supply valve status sensor, a cold water supply valve status sensor, a flow sensor, a hot water temperature sensor, or a fluid composition sensor.

9. The fluid delivery system of claim 1, wherein the system control means includes a digital processor programmable to receive a signal from the thermosensor and to compute therefrom an error value between the present mixed fluid temperature and a user-selected or pre-programmed target temperature for the mixed fluid.

10. The fluid delivery system of claim 1, wherein the system control means includes a microprocessor comprising a central processing unit (CPU) operably connected with an input/output (I/O) inter-face, random access memory (RAM), and read only memory (ROM).

11. The fluid delivery system of claim 1, wherein the system control means includes a programmable digital processor designed to implement feedback control of one or more system parameters or functions selected from target temperatures, flow rates, and desired volumes.

12. The fluid delivery system of claim 1, wherein the system control means includes a programmable digital processor for implementing feedback control of one or more system parameters or functions and wherein programming of the digital processor can be changed by entry of programming data via said user interface.

13. The fluid delivery system of claim 1, wherein the system control means includes a programmable digital processor which implements feedback control of one or more system parameters based on a control algorithm that is selected from a proportional, proportional plus integral, proportional plus integral plus derivative, or feed forward control algorithm.

14. The fluid delivery system of claim 1, wherein the system control means is adapted to process a signal provided by a flow sensor to provide information concerning present flow rate, total flow volume, or flow time via the user interface, to actuate a flow control valve to deliver a pre-programnmed or user-selected flow rate or to shut-off flow from a system outlet when a pre-programmed or user-selected flow volume or flow time has been reached, to receive and store a user-selected set flow rate, total flow volume or flow time that is automatically recalled upon subsequent entry of a user identification signal by the same user causing the control unit to send user-specific command signals to regulate flow rate, volume or time at a system outlet, or to compute total flow volume or time for a selected use period which computed volume or time value may be displayed via the user interface or stored to memory and later displayed or further processed to track use volumes and times per use period or user.

15. The fluid delivery system of claim 1, wherein the system control means is adapted to process a signal provided by a thermosensor to provide information concerning present temperature(s) within the system, to actuate said fluid supply valve to deliver a pre-programmed or user-selected temperature of fluid at a system outlet when a pre-programmed or user-selected temperature has been reached, to close said fluid supply valve when a pre-programmed or user-selected maximum temperature of fluid has been reached, or to receive and store a user-selected set temperature value that is automatically recalled upon subsequent entry of a user identification signal by the same user causing the control unit to send user-specific command signals to regulate temperature of fluid at the system outlet.

16. The fluid delivery system of claim 1, wherein the system control means incorporates a programmable time clock and/or year calendar that provides display signal whereby a current time and/or date indicator is received and displayed on the user display and allows allow chronologically programmed control of a system function or parameter.

17. The fluid delivery system of claim 1, wherein the system control means is programmable to actuate a selected system function or parameter prior to a pre-set time or date to automatically adjust hot water temperature, mixed fluid temperature, flow rate, time or volume to achieve a designated set value at the pre-set time or date.

18. The fluid delivery system of claim 1, wherein said remote system monitoring/control device comprises a mainframe computer or server which independently or coordinately monitors and controls multiple fluid delivery systems.

19. The fluid delivery system of claim 1, wherein said remote system monitoring/control device is connected with said system control means via infrared (IR), radio frequency (RF), internet, intranet, direct connect remote access, satellite, or laser connection.

20. The fluid delivery system of claim 1, further comprising external data storage and input means for transferring data to the control means to control a system function or parameter.

21. The fluid delivery system of claim 20, wherein said external data storage and input means is a personal data storage template adapted to store and transfer a range of personal information directly or indirectly to the fluid control system.

22. The fluid delivery system of claim 21 which comprises a commercial hospitality fluid delivery system, wherein said personal data storage template is adapted to store and transfer personal data that optionally includes dates of hotel stays, selected times for activation or adjustment of fluid control parameters including bathwater flow or adjustment of shower temperature, selected times for wake up calls, desired room temperatures, selected times for meals, selections for dry cleaning, meals, rental car and entertainment options, and/or accommodation preferences.

23. The fluid delivery system of claim 22, including an optional input means comprising an external data processing device.

24. The fluid delivery system of claim 1 which comprises a domestic water supply system.

25. The fluid delivery system of claim 1 which comprises a central heating and cooling system.

26. A fluid delivery system for controlling fluid temperature, flow rate and volume at a system outlet comprising:

a fluid supply control valve for regulating flow of a first fluid and a second fluid from corresponding first and second fluid sources into a mixing port, wherein said first fluid has a different temperature from said second fluid;

a fluid supply control valve actuator operatively connected to said fluid supply valve for actuating opening and closure operations thereof;

a thermosensor thermally coupled with said mixing port to sense an estimated present temperature of a mixed fluid within said mixing port;

a fluid control valve for regulating flow of a mixed fluid flow at said system outlet;

a flow control valve actuator operatively connected to said flow control valve for actuating opening and closure operations thereof;

a user interface including user input means for selecting a set temperature, flow rate and volume of fluid at said system outlet and user display means for displaying one or more system functions or parameters;

system control means for receiving signals from said thermosensor and user interface and for processing said signals to generate appropriate control signals to control said fluid supply control valve actuator(s) and said flow control valve actuator means to achieve programmed or user-selected set temperature, flow rate and volume at said system outlet; and external data storage and input means for storing and transferring data to said system control means to control one or more system function(s) or parameter(s).

27. The fluid delivery system of claim 26, wherein data stored by said external data storage and input means can be transmitted or downloaded into the system via one or more data transfer means selected from a serial or parallel port, modem, internet or intranet link, or satellite, optical, infrared, ultrasound, radio frequency (RF), or cellular data transmission.

28. The fluid delivery system of claim 26, wherein said external data storage and input means comprises a personal data storage template adapted to store and transfer personal information data directly or indirectly to the fluid control system.

29. The fluid delivery system of claim 28, wherein said personal data storage template is selected from a hard disk, floppy disk, zip drive, jaz drive, cd-rom, eeprom, or magnetic or optical personal data storage card.

30. The fluid delivery system of claim 28, wherein said personal data storage template comprises a conventional magnetized data storage card which stores data which can be transferred directly to the system control means or to a system memory storage means, or may be input to a central data base serving multiple fluid delivery systems.

31. The fluid delivery system of claim 27, which comprises a commercial hospitality fluid delivery system, wherein said personal data storage template is adapted to store and transfer personal data that optionally includes dates of hotel stays, selected times for activation or adjustment of fluid control parameters including bathwater flow or adjustment of shower temperature, selected times for wake up calls, desired room temperatures, selected times for meals, selections for dry cleaning, meals, rental car and entertainment options, and/or accommodation preferences.

* * * * *